Sept. 28, 1971                    M. VEREBAY                    3,608,219
BOOK FOR HOLDING TRANSPARENCIES FOR VIEWING AND STORAGE
Filed May 19, 1969                                        2 Sheets-Sheet 1
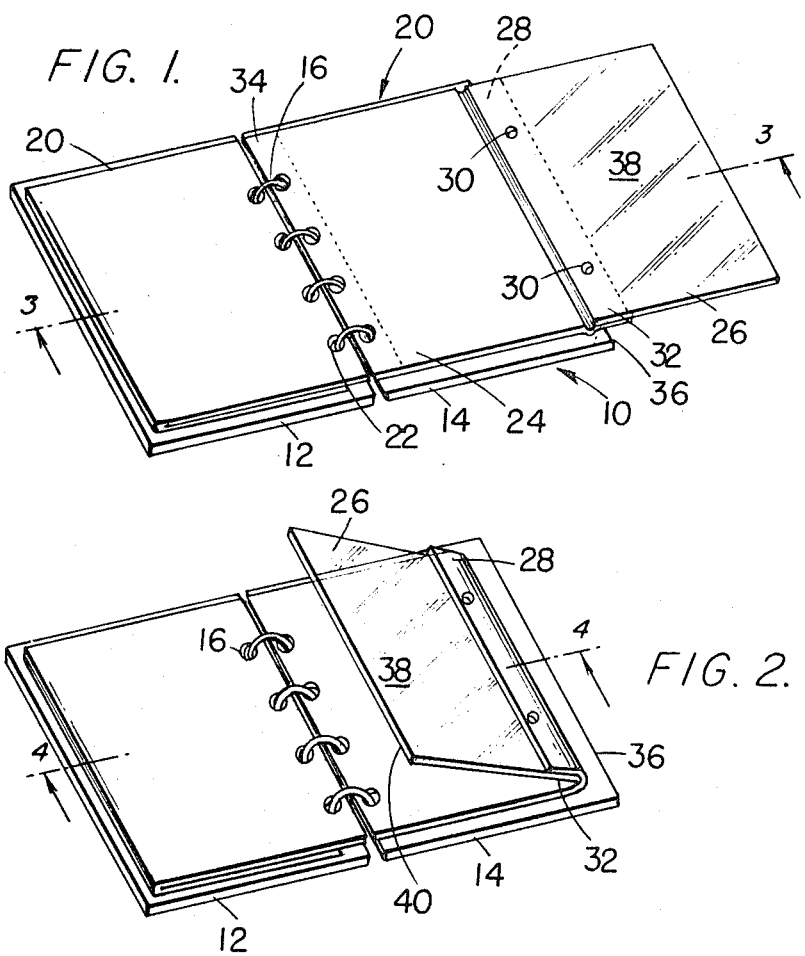
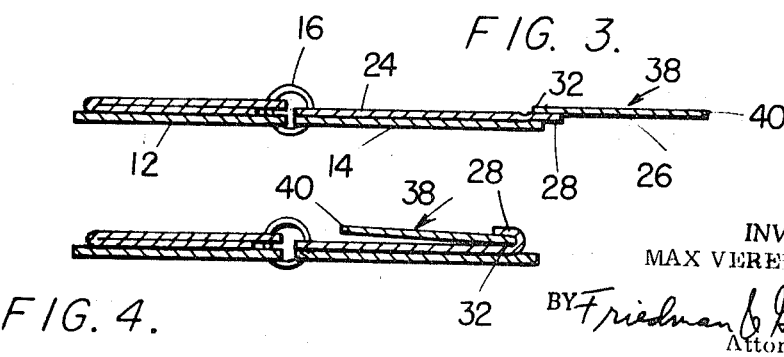
INVENTOR.
MAX VEREBAY
BY Friedman & Goodman
Attorneys INVENTOR.
MAX VEREBAY
BY Friedman & Goodman
Attorneys 3,608,219
BOOK FOR HOLDING TRANSPARENCIES FOR
VIEWING AND STORAGE
Max Verebay, Jamaica, N.Y., assignor to Visionetics,
Inc., Long Island City, N.Y.
Filed May 19, 1969, Ser. No. 825,831
Int. Cl. G09f 11/06
U.S. Cl. 40—102    4 Claims

ABSTRACT OF THE DISCLOSURE

Means for holding transparencies for viewing and storage comprising a book interleaved in a manner such that said transparencies may be selectively viewed either individually or simultaneously in any number in any desired sequence. Each transparency may be provided, if desired, with an accompanying written dialogue.

BACKGROUND OF THE INVENTION

(1) Field of the invention

This invention relates generally to the art of transparencies and, more particularly, to a book for holding transparencies for viewing and storage.

(2) Description of the prior art

Transparencies are becoming increasingly employed for visual dissemination of various types of information, especially in the field of education. Generally, the transparencies are applied to a sheet of transparent plastic material by suitable means such as printing or drawing. The transparencies are commonly viewed by projecting them onto a wall or screen by the use of an overhead projector. Conventionally, the overhead projector consists of a light source in a light-proof box, a lens combination, mirror and a transparency stage or table forming a part of the top of the box. Light then projected through the transparent pages of transparencies to be then directed into a suitable housing in such position that an angularly disposed mirror will project the light and image through a suitable lens assembly for exhibition of the selected views upon a suitable viewing screen. The transparency can be displayed individually or two or more can be combined for projection.

SUMMARY OF THE INVENTION

It is, therefore, one of the principal objectives of this invention to provide improved means for holding transparencies for viewing and storage.

In accordance with the invention the improved means for holding transparencies comprises a book interleaved in a manner such that said transparencies may be selectively viewed either individually or simultaneously in any number, in any desired sequence. In other words, when two or more transparencies are simultaneously projected, each transparency need not be on adjoining pages, but rather may be in different parts of the book. Each transparency may be provided, if desired, with an accompanying written description.

BRIEF DESCRIPTION OF THE DRAWING

The invention will be hereinafter more fully described with reference to the accompanying drawing in which:

FIG. 1 is a view in perspective of a book constructed in accordance with the invention and as shown in a fully opened condition with a page of transparencies in a viewable position.

FIG. 2 is a view similar to FIG. 1 except that the transparency is shown partially folded back into the body of the book.

FIG. 3 is a sectional view taken along line 3—3 of FIG. 1.

FIG. 4 is a sectional view taken along line 4—4 of FIG. 2.

DESCRIPTION OF THE SPECIFIC EMBODIMENTS

Figure 5:
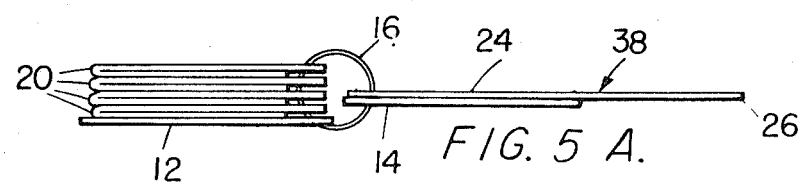
FIG. 5A is an end view of the book as shown in FIG. 1.
FIG. 5B is an end view similar to FIG. 5A except that two adjoining pages of transparencies are in a smoothly abutted simultaneously viewable position.
FIG. 5C is a view similar to FIG. 5B except that three pages of transparencies are in a smoothly abutted simultaneously viewable position.
FIG. 5D is a view similar to FIG. 5C execpt that the first and third pages of transparencies are in a superposed spaced simultaneously viewable position with the second page of transparencies folded back into the body of the book.
FIG. 5E is a view similar to FIG. 5D except that the first and fourth pages of transparencies are in a superposed spaced simultaneously viewable position with the second and third pages of transparencies folded back into the body of the book.
FIG. 5F is a view similar to FIG. 5B except that the first page of transparencies is folded back into the book and the second page only of the transparency is in the viewable position.
Figure 5:
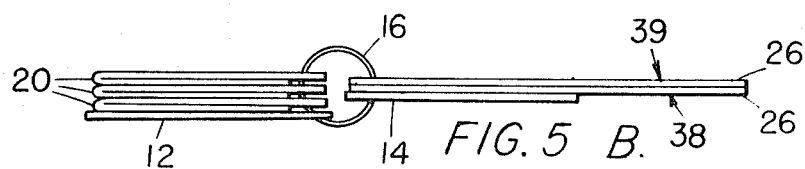
Figure 5:
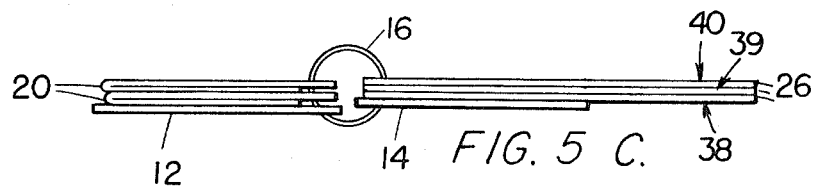
Figure 5:
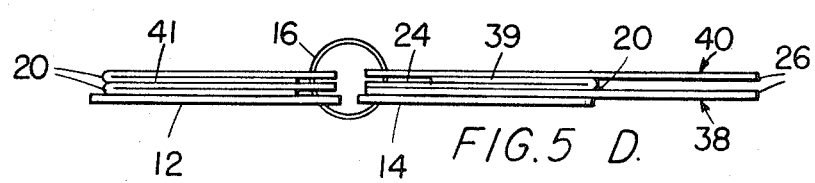
Figure 5:
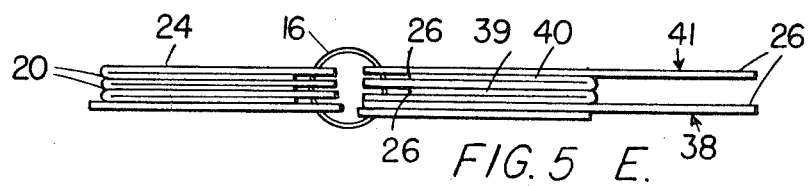
Figure 5:
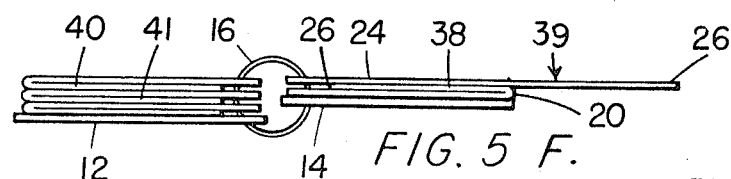

Referring now to the figures in detail, and especially to FIGS. 1–4, there is shown illustrated therein the invention for holding transparencies, e.g. such as those made of cellulose acetate film, for viewing and storage comprising a book 10, including a pair of rectangular covers 12 and 14 connected by looseleaf type rings 16; a spiral metal binder may also be used. Book 10 is interleaved in a manner which adapts the transparencies contained therein to be selectively viewed either individually or simultaneously in any number or any desired sequence. This is accomplished by providing, between the said covers 12 and 14 of the book, a plurality of pages 20 secured into the books by means of the looseleaf rings 16 which pass through apertures 22 therefor provided at the inside longitudinal margins 34 of each page.

Each page 20 further comprises a double page consisting of a first page member 24 and a second page member 26. First page member 24 is sized so that it will fit longitundinally just inside the covers 12 and 14, however, its transverse dimension is such that a longitudinal marginal portion 28 extends outwardly of the longitudinal outermost edge 36 of the cover 14. The second page member 26, which constitutes a page of transparency 38 suitably printed, is secured, e.g. adhesively, to the longitudinal margin 28 of the first page member 24 in overlapping abutting relation via its inner longitudinal margin 32. Thus the second page member 26 containing the transparency is adapted to be folded over upon the first page member 24 and is suitably sized to fit completely inside the covers of the book, its outermost longitudinal edge 40 restable inwardly of looseleaf rings 16. The longitudinal dimensions of the first and second page members are the same so that they will be in smooth longitudinal edge to edge relationship when the second page member is folded over upon the first, and in straight line edge to edge relationship when the second page member 26 is fully horizontally unfolded.

When it is desirous to view the transparency 38 by means of a suitable overhead projector (not shown) all that need to be done is to unfold the page 26 containing the transparency until it is in a flat horizontal condition with the transparency being placed over the light source of the overhead projector. A pair of vertically aligned registered apertures 30 may be provided along the inner and outer margins 32 and 28, respectively, of the first and second page members through which apertures registerable bosses may pass for affixing the page of transparency securely to a viewing stage, for example. Such a stage is shown in copending application Ser. No. 825,685, filed May 19, 1969, for "Stage for Transparency Projection," assigned to this common assignee and filed on the same date as this application.

While the first page member 24 may also be a page of transparencies, it is oftentimes desirable to provide, instead, a page of written dialogue from which the projector operator may read a description of the material being shown by the transparency or transparencies simultaneously.

Referring now to FIGS. 5A through 5F, the means by which the transparency may be selectively viewed either individually or simultaneously in any number and/or in any desired sequence according to the inventive features of the invention, are illustrated. In FIG. 5A there is shown a single page of transparency 38 in the horizontal viewable position. That is to say, second page member 26 (containing the transparency) has been fully unfolded outwardly away from first page member 24 contained flatly within the body of the book and resting on cover 14. It is to be noted that the other pages 20 of the book remain undisturbed in a double condititon and resting against the other cover 12 of the book. FIGS. 5B and 5C illustrate, respectively, the situation where two and three adjoining pages of transparencies 38, 39 and 40 horizontally extended in a flat, smoothly abutted, superposed simultaneously viewable condition. In contrast thereto, FIG. 5D shows the case where the first and third pages of transparencies 38 and 40 are in a superposed spaced simultaneously viewable position, and the second page of transparency 39 is folded over first page member 24 and back within the confines of the book.

Still further, FIG. 5E shows an instance in which it is desired to view the first and fourth pages of transparencies 38 and 41 simultaneously, with the second and third pages of transparencies 39 and 40 folded back into the back respectively so that only the first and fourth pages 38 and 41 are in a position to be simultaneously viewed.

Finally, FIG. 5F shows the situation where the first page of transparency 38 is folded back into the book and only the second page of transparency 39 is ready to be viewed.

Thus it can be seen that in accordance with the invention there has now been provided improved means for holding transparencies so that the transparency may be selectively viewed one at a time, or simultaneously in sequence, or simultaneously in any desired sequence.

I claim:

1. A book for holding transparencies comprising a pair of covers, a plurality of double pages disposed between said covers, each of said double pages including a first page member and a second page member, said second page member comprising a sheet of transparent material provided with a transparency, first means hingedly securing each first page member to said covers for holding said transparency of each second page member in a selected position, one selected position being for storage, another selected position being for viewing in a manner such that the transparencies may be selectively individually viewed, selectively simultaneously viewed or simultaneously sequentially viewed, said first page member including a wide first portion provided with a first longitudinal margin, said first longitudinal margin receiving said first securing means, said first portion being sized to fit within each edge of said covers, said first page member also including a narrow second portion secured to and foldable upon said first portion along an opposing second longitudinal margin of said first portion, second means for each double page for securing said second page member to said second portion of said first page member in an overlapping abutting marginal relationship adjacent to said second longitudinal margin to permit said second page member to be folded upon said first page member when disposed in said selected storage position with said second page member being disposed between said first and second portions of said first page member, said second securing means also permitting said second page member to be extended outwardly beyond the edges of said covers in a direction away from said first and second longitudinal margins of said first portion when disposed in said selected viewing position with said second portion also extending outwardly beyond the edges of said covers in the same direction, and opening means provided through the overlapping abutting margins of said second page member and said second portion of said first page member for affixing said second page member securely to a viewing stage, said opening means being disposed outwardly beyond the edges of said covers when disposed in said selected viewing position for properly positioning said second page member on the viewing stage.

2. A book according to claim 1 wherein at least one of said first page members contains a written dialogue describing the transparency marginally adjoining it.

3. A book according to claim 1 wherein at least one of said first page members contains a written dialogue describing a plurality of transparencies in a simultaneously viewable position.

4. A book according to claim 1 wherein said opening means further comprise a pair of vertically aligned apertures.

References Cited

UNITED STATES PATENTS

| | | | |
|---|---|---|---|
| 2,316,786 | 4/1943 | Gottlieb | 35—40 |
| 2,962,825 | 12/1960 | Bravo et al. | 40—106.1 |
| 3,253,358 | 5/1966 | Wright | 40—106.1 |

ROBERT W. MICHELL, Primary Examiner

L. R. OREMLAND, Assistant Examiner

U.S. Cl. X.R.

281—3